H. I. ABBOTT.
AUTOMOBILE LOCK.
APPLICATION FILED OCT. 10, 1916.
1,228,633.
Patented June 5, 1917.
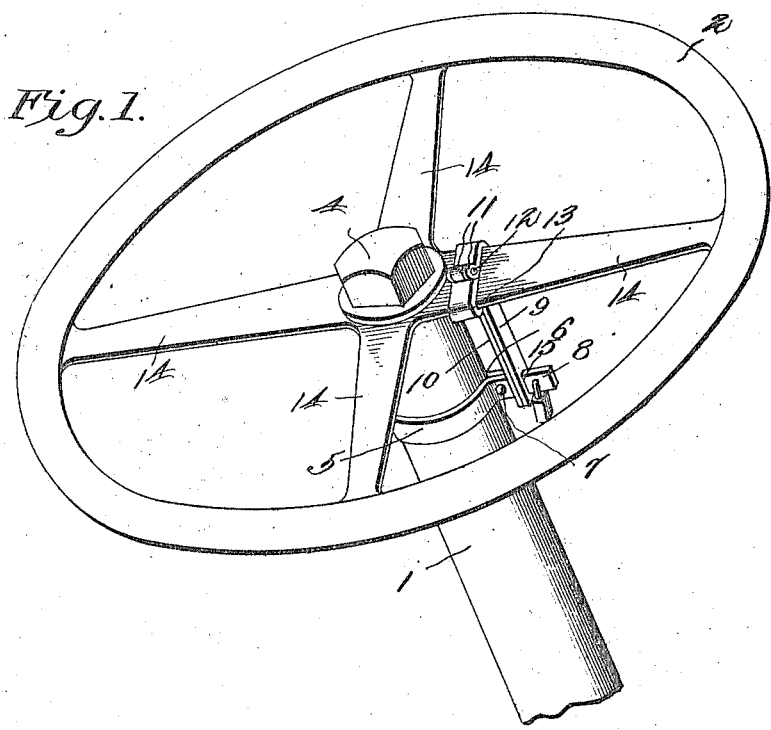
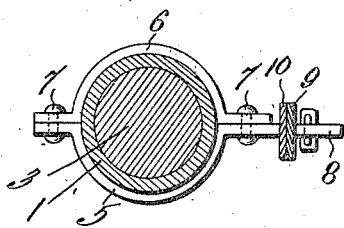
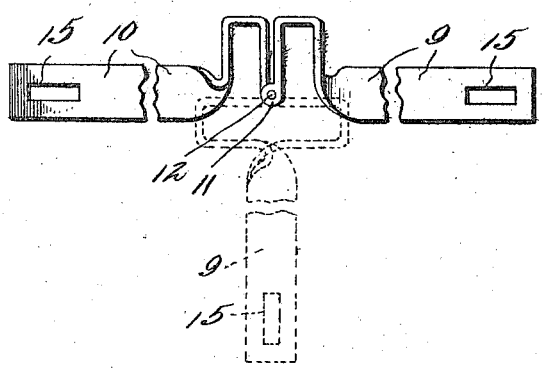
Witnesses
Inventor
Harley I. Abbott
By Victor J. Evans
Attorney

UNITED STATES PATENT OFFICE.

HARLEY I. ABBOTT, OF BATTLE CREEK, MICHIGAN.

AUTOMOBILE-LOCK.

1,228,633.  Specification of Letters Patent.  Patented June 5, 1917.

Application filed October 10, 1916. Serial No. 124,866.

*To all whom it may concern:*

Be it known that I, HARLEY I. ABBOTT, a citizen of the United States, residing at Battle Creek, in the county of Calhoun and State of Michigan, have invented new and useful Improvements in Automobile-Locks, of which the following is a specification.

This invention relates to locks for steering mechanisms.

The object of the invention is to provide a device of this character which may be readily adjusted to the steering mechanism of a vehicle, and when in position will effectively prevent the use of the vehicle by unauthorized persons.

Another object of the invention is to provide a device of the above character which when not in use will not present an unsightly appearance to the vehicle nor in any way interfere with the operation of the same.

Other objects and advantages of the invention will appear from the following description when taken in connection with the accompanying drawings, in which;

Figure 1 is a perspective view of the steering wheel and adjacent steering post casing of a vehicle having the invention applied thereto;

Fig. 2 is a horizontal sectional view taken on a plane below the steering wheel;

Fig. 3 is a detail elevation of the hinged hasp members swung open.

In the drawings in which like characters of reference denote corresponding parts the numeral 1 denotes the casing of the steering post of a vehicle. The usual steering wheel 2 is mounted upon the post 3 and is secured in position thereon by a nut 4.

In constructing the improved lock the same comprises a pair of semi-circular members 5 and 6 adapted to encircle the casing 1 and to be permanently secured thereon by means of rivets 7. The member 5 has one of its ends extended beyond the member 6 to form a lug 8 as plainly shown in Figs. 1 and 2 of the drawings. This lug is adapted to engage the hasp members 9 and 10, which when the lock is in position are carried by the wheel 2. The hasp members are identical in construction each being formed with apertured lugs 11 adapted to receive a pin 12 by which the members 9 and 10 are hinged together. A loop 13 is formed by the members 9 and 10, the said loop being of such a size as to surround any one of the spokes 14 of the steering wheel 2. Below this loop the shanks of the members 9 and 10 are so twisted as to lie in a plane parallel to the steering post, and are provided at their extremities with apertures 15.

It will be seen from the drawing that when the shanks of the members 9 and 10 are brought together the loop 13 will surround the spoke 14, the shanks of the said members overlapping so as to bring into register the apertures 15. The said apertures are then passed over the lug 8 and are securely locked in position by means of a pad lock 16 secured thereto.

It will be seen from the above description that the invention provides a novel and efficient means for securely locking and preventing the operation of the steering mechanism. It is also apparent that when the lock is not in use the members 9 and 10 may be removed from the steering wheel so that the only evidence of a device of this character are the members 5 and 6 secured to the steering post.

I reserve the right to make such changes in the form and proportion of the invention as may fall within the scope of the appended claim.

Having described the invention, what I desire to claim is;—

A lock for a steering mechanism comprising a pair of semi-circular members formed of flat metal and permanently secured to the steering post casing, an apertured lug formed by the extension of one of said members, a removable element comprising flat metal members bent at one end to form laterally extending U-shaped portions, said portions being hinged together and adapted to be closed to form a flat loop for engagement with the spoke of a steering wheel, said members being given a quarter turn and bent at right angles to said U-shaped sections and brought into alining contact, said sections being further provided with registering openings adapted to be slid over the lug of the semi-circular member and a lock for engagement with said lug.

In testimony whereof I affix my signature.

HARLEY I. ABBOTT.